US012743265B2

(12) United States Patent
Feng et al.

(10) Patent No.: US 12,743,265 B2
(45) Date of Patent: Sep. 22, 2026

(54) VERSION UPDATING SYSTEM AND VERSION UPDATING METHOD

(71) Applicants: DIGIWIN CO., LTD., Shanghai (CN); DATA SYSTEMS CO., LTD., New Taipei City (TW)

(72) Inventors: Lei Feng, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 191 days.

(21) Appl. No.: 18/443,269

(22) Filed: Feb. 15, 2024

(65) Prior Publication Data

US 2025/0085957 A1 Mar. 13, 2025

(30) Foreign Application Priority Data

Sep. 13, 2023 (CN) ......................... 202311181642.1

(51) Int. Cl.
*G06F 8/00* (2018.01)
*G06F 8/65* (2018.01)

(52) U.S. Cl.
CPC ...................................... *G06F 8/65* (2013.01)

(58) Field of Classification Search
CPC ......................................................... G06F 8/65
See application file for complete search history.

(56) References Cited

U.S. PATENT DOCUMENTS

2019/0081861 A1* 3/2019 Kaluza ................ H04L 41/0853
2020/0278859 A1* 9/2020 Olderdissen ........ G06F 9/45558
2022/0413827 A1* 12/2022 Agarwal ............. G06F 11/3419
2025/0036384 A1* 1/2025 Dovis ....................... G06F 8/60

* cited by examiner

*Primary Examiner* — Syed H Hasan
(74) *Attorney, Agent, or Firm* — JCIPRNET

(57) ABSTRACT

A version updating system and a version updating method are provided. The version updating system includes a cloud server configured to execute a version updating tool, a version matching component, and a heterogeneous system management module that communicates with a heterogeneous system and a sub-business system. When the cloud server receives a version updating request for a cloud application, the version updating tool executes and prompts the version matching component to obtain version information of the heterogeneous system through the heterogeneous system management module. When the version information fails to meet version requirements, the version matching component records that the version information does not meet the version requirements and transmits a version updating notification to the sub-business system. After the sub-business system halts operation based on the version updating notification, the version matching component notifies the version updating tool of performing a version updating operation for the cloud application.

16 Claims, 5 Drawing Sheets

VERSION UPDATING SYSTEM AND VERSION UPDATING METHOD

CROSS-REFERENCE TO RELATED APPLICATION

This application claims the priority benefit of China application serial no. 202311181642.1, filed on Sep. 13, 2023. The entirety of the above-mentioned patent application is hereby incorporated by reference herein and made a part of this specification.

BACKGROUND

Technical Field

The disclosure relates to a maintenance method of a cloud application and a heterogeneous system; more particularly, the disclosure relates to a version updating system and a version updating method.

Description of Related Art

When a service system utilized in a local manner within an enterprise, such as an Enterprise Resource Planning (ERP) system, integrates with a cloud service framework, an issue arises concerning the consistency between version updates of applications of a cloud system and version updates of enterprise-end applications. Besides, as local enterprise services may follow a conventional comprehensive deployment approach, modifying an application necessitates the update of the operating software of the entire system. However, the operating software encompasses numerous diverse applications which are not deployed in the manner of Software as a Service (SaaS) as done by the cloud system. In response thereto, the cloud system applications not only implement version updates through hot deployment but also cater to enterprises that engage various software providers, whereas the system upgrades performed by different enterprises may yield entirely distinct operational outcomes.

SUMMARY

According to an embodiment of the disclosure, a version updating system includes a cloud server. The cloud server is configured to execute a version updating tool, a version matching component, and a heterogeneous system management module. The heterogeneous system management module communicates with a heterogeneous system and a sub-business system. When the cloud server receives a version updating request for a cloud application, the version updating tool executes the version matching component to prompt the version matching component to obtain version information of the heterogeneous system through the heterogeneous system management module. When the version information of the heterogeneous system fails to meet version requirements, the version matching component records that the version information of the heterogeneous system fails to meet the version requirements, and the version matching component transmits a version updating notification to the sub-business system. After the sub-business system halts its operation according to the version updating notification, the version matching component notifies the version updating tool and prompt the version updating tool to perform a version updating operation for the cloud application.

According to an embodiment of the disclosure, a version updating method includes following steps. When a cloud server receives a version updating request for a cloud application, a version matching component is executed by a version updating tool to prompt the version matching component to obtain version information of a heterogeneous system by a heterogeneous system management module. When the version information of the heterogeneous system fails to meet version requirements, the version matching component records that the version information of the heterogeneous system fails to meet the version requirements and transmits a version updating notification to a sub-business system. After the sub-business system halts its operation according to the version updating notification, the version updating tool is notified by the version matching component and prompted to perform a version updating operation for the cloud application.

In light of the above, the version updating system and the version updating method provided in one or more embodiments of the disclosure may be applied to effectively update the version of the cloud application.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
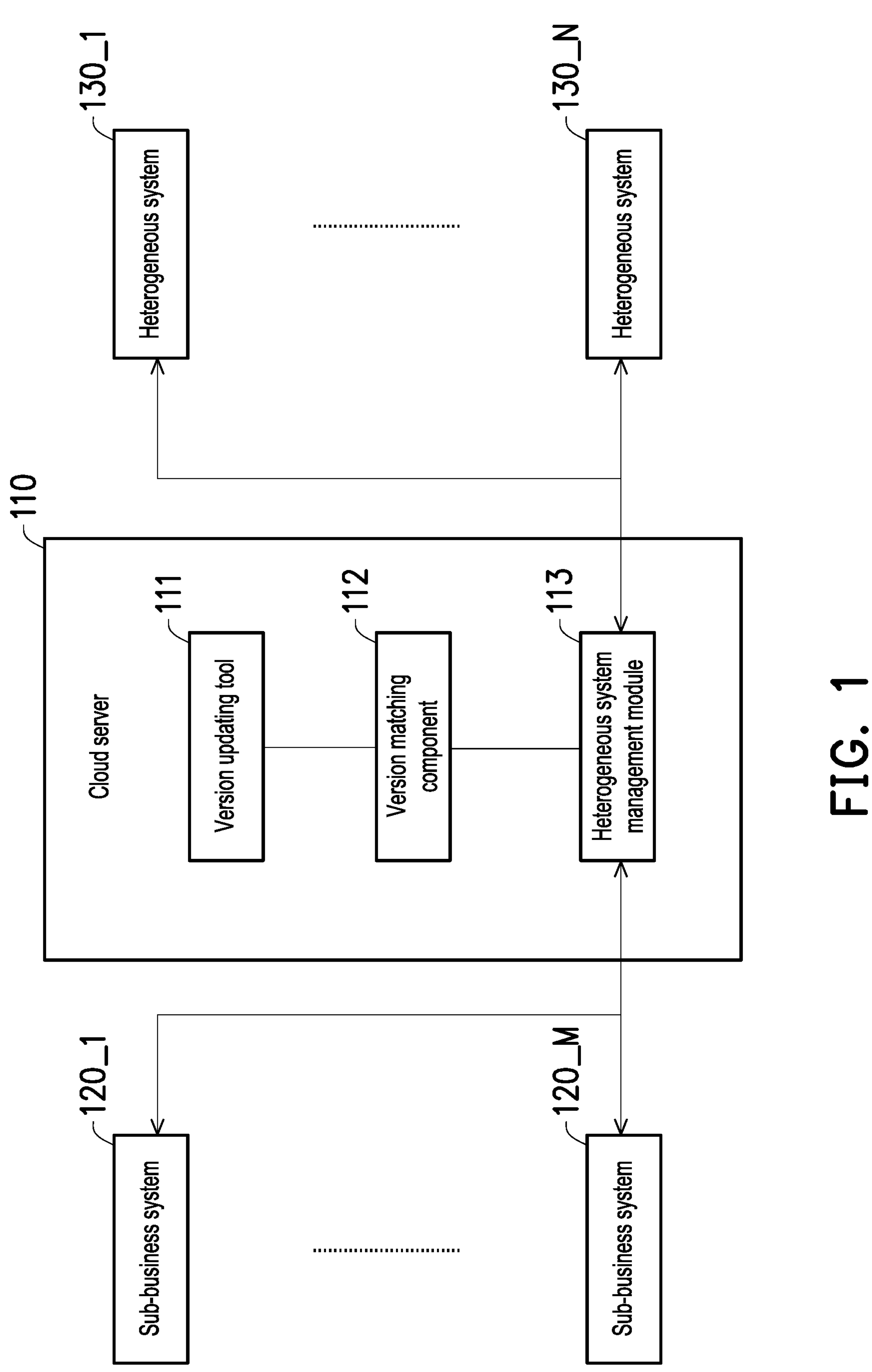
FIG. 1 is a schematic view illustrating a version updating system according to an embodiment of the disclosure.

Reference will now be made in detail to the embodiments of the disclosure, examples of which are illustrated in the accompanying drawings. Wherever possible, the same reference numbers are used in the drawings and the description to refer to the same or like parts.

FIG. 1 is a schematic view illustrating a version updating system according to an embodiment of the disclosure. With reference to FIG. 1, the version updating system 100 includes a cloud server 110, where the cloud server 110 is configured to communicate with sub-business systems 120_1~120_M and heterogeneous systems 130_1~130_N through cables, in a wireless manner, or through internet. Here, M and N are positive integers, respectively. In this embodiment, the sub-business systems 120_1~120_M may be arranged in the cloud server 110 or in other cloud servers. The heterogeneous systems 130_1~130_N may be arranged in the same or different local servers. Alternatively, the heterogeneous systems 130_1~130_N may also be arranged in a private cloud server deployed by the enterprise. In this embodiment, the cloud server 110 may execute a version updating tool 111, a version matching component 112, and a heterogeneous system management module 113.

In this embodiment, the cloud server 110 may include a processor and a storage device. The processor may be a system on a chip (SOC) or may include, for instance, a central processing unit (CPU) or another programmable general-purpose or special-purpose microprocessor, digital signal processor (DSP), programmable controller, application specific integrated circuit (ASIC), programmable logic device (PLD), any other similar processing device, or a combination of these devices. The storage device may be, for instance, a dynamic random access memory (DRAM), a flash memory, a non-volatile random access memory (NVRAM), or the like. The storage device may store the version updating tool 111, the version matching component 112, and the heterogeneous system management module 113 for the execution of the processor.

In this embodiment, the cloud server 110 may be configured to implement a Kubernetes (K8S) distributed architecture, which should however not be construed as a limitation in the disclosure. K8S refers to a system that manages microservices and automatically deploys and manages a plurality of containers across a plurality of machines. Accordingly, the version updating tool 111, the version matching component 112, the heterogeneous system management module 113, together with a designing tool, a front-end page message distribution unit, and an enterprise subscription application relationship management service in the following embodiments, may be deployed on the cloud server and run as independent services in the form of the containers. In an embodiment of the disclosure, the version updating tool 111, the version matching component 112, the heterogeneous system management module 113, together with the designing tool, the front-end page message distribution unit, and the enterprise subscription application relationship management service in the following embodiments, may also be implemented in the form of programming languages, such as JavaScript Object Notation (JSON), Extensible Markup Language (XML), YAML, or the like.

Figure 2:
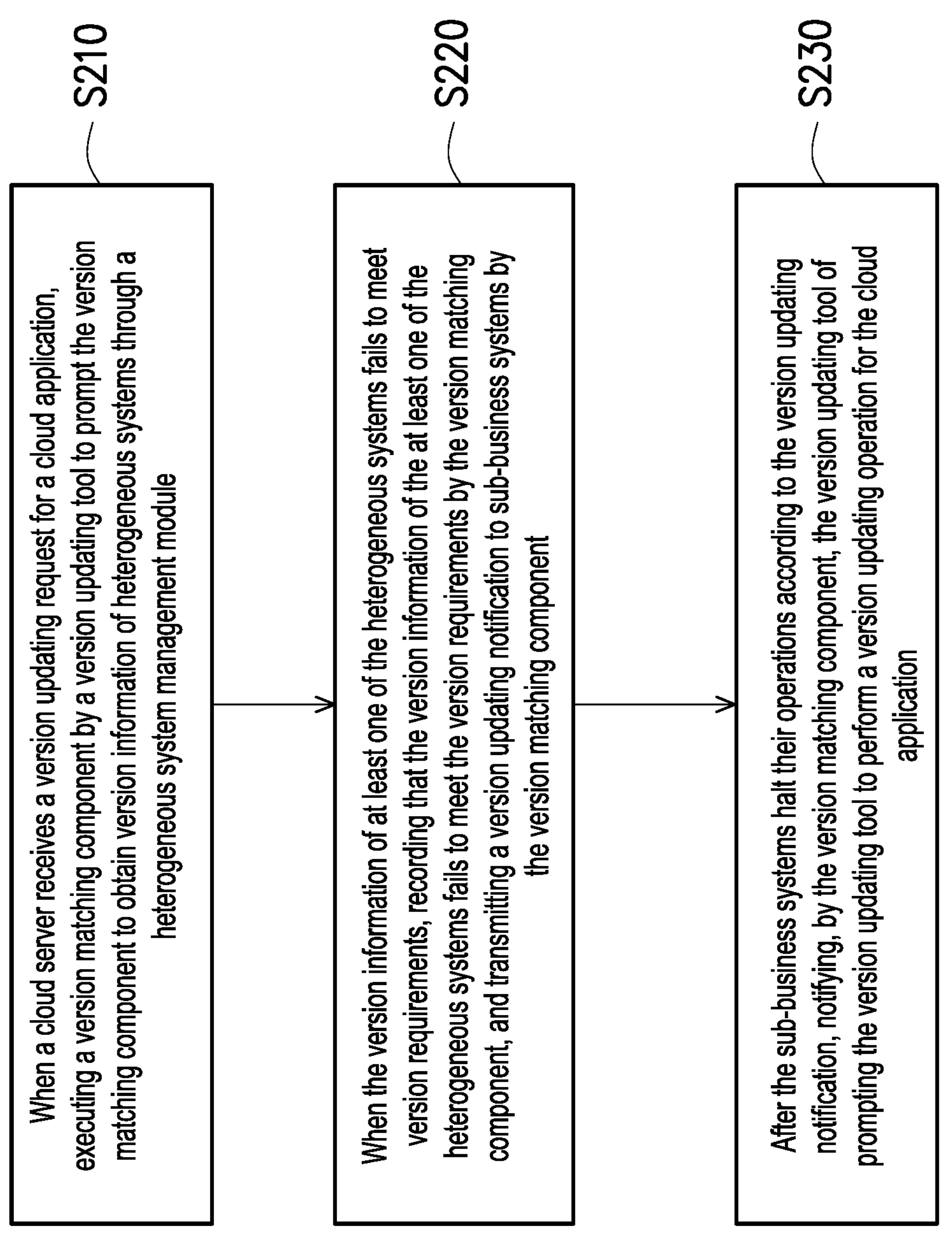
FIG. 2 is a schematic view illustrating a version updating method according to an embodiment of the disclosure.

FIG. 2 is a schematic view illustrating a version updating method according to an embodiment of the disclosure. With reference to FIG. 1 and FIG. 2, the version updating system 100 may perform following steps S210~S230 to achieve a version updating operation. In step S210, when the cloud server 110 receives a version updating request for the cloud application, the version updating tool 111 may execute the version matching component 112 to prompt the version matching component 112 to obtain version information of the heterogeneous systems 130_1~130_N through the heterogeneous system management module 113. In step S220, when the version information of at least one of the heterogeneous systems 130_1~130_N fails to meet version requirements, the version matching component 112 records that the version information of the at least one of the heterogeneous systems 130_1~130_N fails to meet the version requirements, and the version matching component 112 transmits a version updating notification to the sub-business systems 120_1~120_M. In step S230, after the sub-business systems 120_1~120_M halt their operations according to the version updating notification, the version matching component 112 notifies the version updating tool 111 of prompting the version updating tool 111 to perform the version updating operation for the cloud application. Therefore, the version updating method provided in an embodiment of the disclosure may be applied to effectively avoid the situation where the sub-business systems 120_1~120_M erroneously call the heterogeneous systems 130_1~130_N during the version updating operation for the cloud application. The detailed version updating operation for the cloud application is further explained in the following embodiments.

Figure 3:
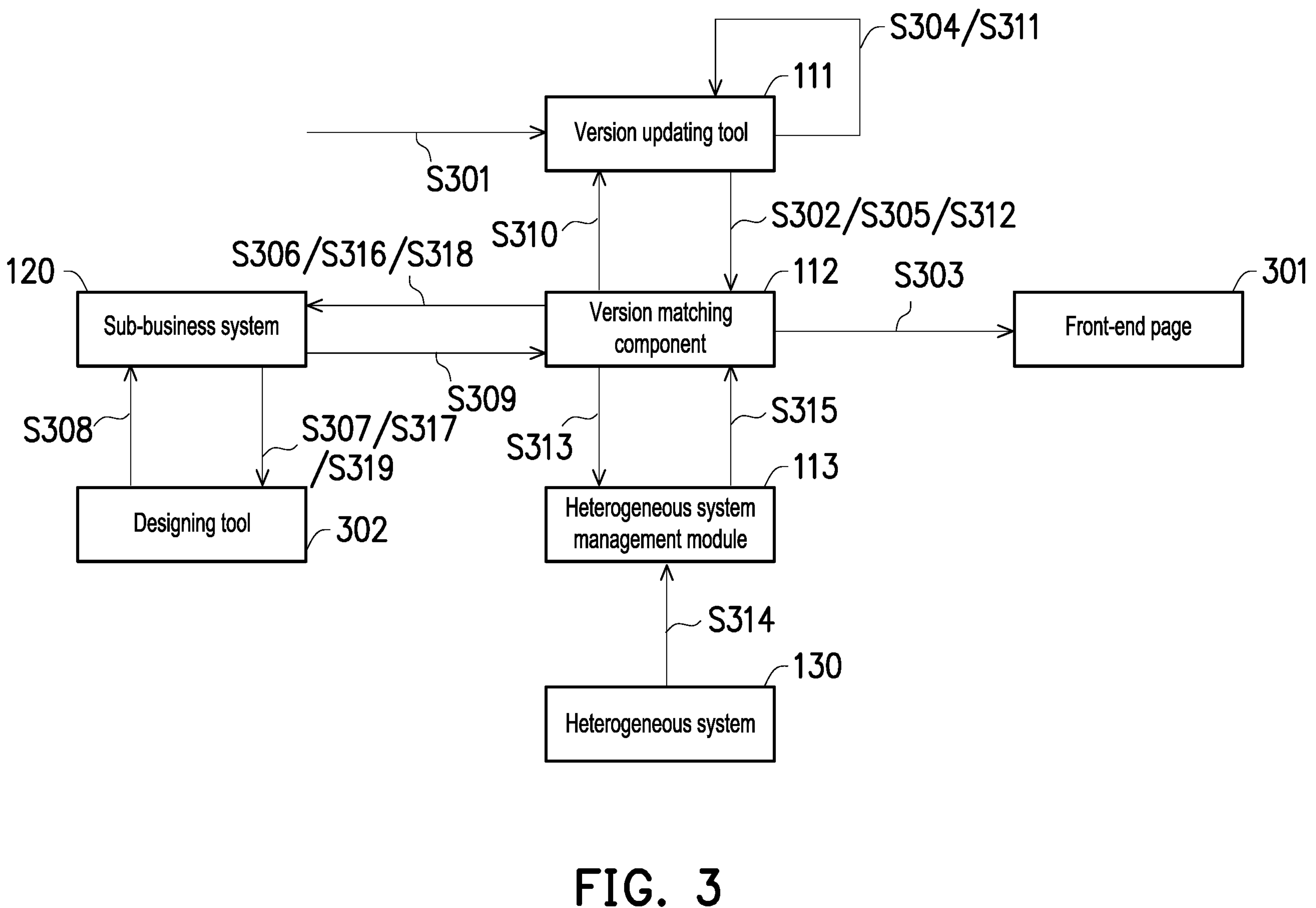
FIG. 3 is a schematic view illustrating a version updating process of a cloud application according to an embodiment of the disclosure.

FIG. 3 is a schematic view illustrating a version updating process of a cloud application according to an embodiment of the disclosure. With reference to FIG. 1 and FIG. 3, in this embodiment, the version updating system 100 may perform following steps S301~S312 to perform a version updating operation for the cloud application. In step S301, the version updating tool 111 may receive a version updating request command issued by a software update publisher, for instance. In step S302, the version updating tool 111 may execute the command to operate the version matching component 112. In step S303, the version matching component 112 may notify a user or a designing tool (operated by a software designer during software development or enterprise configuration stages, for instance) to cease usage through a front-end page 301, for instance, with a five-minute advance notice. In step S304, the version updating tool 111 waits for a default time (e.g., five minutes) before proceeding with subsequent actions. In step S305, the version updating tool 111 sends a version updating notification to the version matching component 112 to initiate a cessation process. In step S306, the version matching component 112 sends a version updating notification to the sub-business system 120 (one sub-business system is exemplified in this embodiment, while more sub-business systems are also applicable), thus prompting the sub-business system 120 to temporarily halt its operation and notify the user or a tenant. The sub-business system 120 may, for instance, be a data change detection subsystem, a workflow subsystem, a front-end page subsystem, and so forth, which should not be construed as a limitation in the disclosure. The data change detection subsystem is taken as an example. In step S307, the sub-business system 120 may reject the operation from the designing tool 302 (operated by the software designer during software development or enterprise configuration stages). In step S308, upon successful suspension of operations by the designing tool 302, the designing tool 302 notifies the sub-business system 120. In step S309, the sub-business system 120 notifies the version matching component 112 that the suspension is completed. In step S310, the version matching component 112 notifies the version updating tool 111 that the suspension is completed. In step S311, the version updating tool 111 proceeds with a version updating operation for the cloud application. In step S312, the version updating tool 111 notifies the version matching component 112 of the successful completion or failure of the version update.

In this embodiment, when the cloud application successfully completes the version updating operation, the version updating system 100 may perform following steps S312~S317. In step S312, the version updating tool 111 may notify the version matching component 112 of updating the version information of the cloud application. In step S313, the version matching component 112 may notify the heterogeneous system management module 113. In step S314, the heterogeneous system management module 113 may obtain/update the version information of the heterogeneous system 130 (one heterogeneous system is exemplified in this embodiment, while more heterogeneous systems are also applicable). In step S315, the heterogeneous system management module 113 may synchronically update the version information of the heterogeneous system 130 to the version matching component 112. In this embodiment, when the version information of the cloud application is inconsistent with the version information of the heterogeneous system 130, the version matching component 112 may regularly visit the heterogeneous system management module 113 to continuously update the version information of the heterogeneous system 130 (i.e., the latest steady-state version) and compare the result with the cloud application. In step S316, the version matching component 112 may notify the sub-business system 120. In step S317, the sub-business system 120 resumes the operation of the designing tool 302 or notifies the user or the tenant that the cloud application has successfully completed the version update.

In this embodiment, when the cloud application fails to be updated, the version updating system 100 may perform following steps S312 and S318~S319. In step S312, the version updating tool 111 may notify the version matching component 112 of prompting the version matching component 112 to cancel the version update of the heterogeneous system 130 through the heterogeneous system management module 113. In step S318, the version matching component 112 may notify the sub-business system 120. In step S319, the sub-business system 120 may resume the operation of the designing tool 302 or notify the user or the tenant that the version update for the cloud application has failed.

Therefore, according to the version updating system 100 and the version updating method provided in this embodiment, when the cloud application running on the cloud server is being updated, the cloud server may automatically perceive whether the heterogeneous system that operates the enterprise system suspends providing business services, so as to effectively prevent service operation errors. Moreover, in the version updating system 100 and the version updating method provided in this embodiment, based on the success or failure of the update for the cloud application, the version information may be updated in real time, or the system operation may be resumed in real time.

Figure 4:
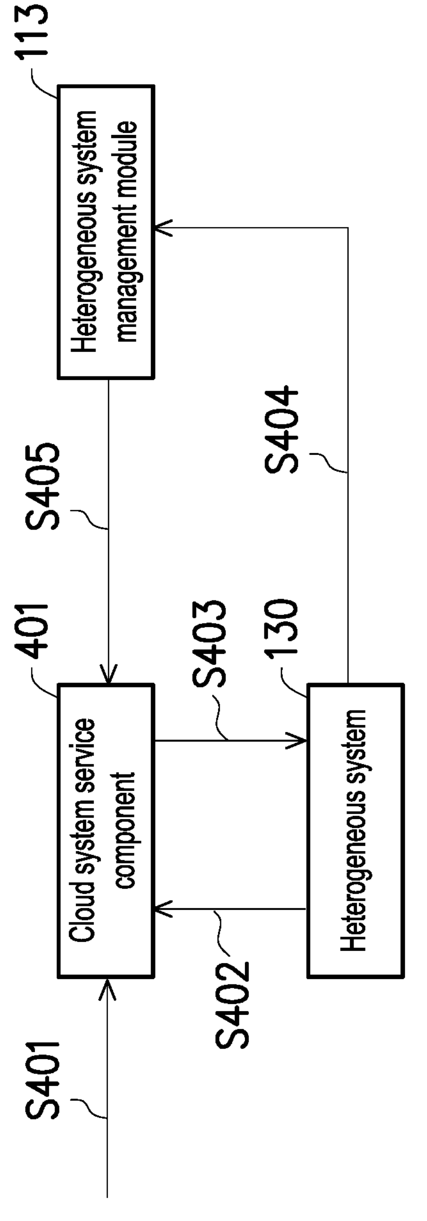
FIG. 4 is a schematic view illustrating a version updating process of a heterogeneous system according to an embodiment of the disclosure.

FIG. 4 is a schematic view illustrating a version updating process of a heterogeneous system according to an embodiment of the disclosure. With reference to FIG. 1 and FIG. 4, the version updating system 100 may perform following steps S401~S405 to achieve the version update of the heterogeneous system (the enterprise local system). In this embodiment, the cloud server 110 may further execute a cloud system service component 401. In step S401, the cloud system service component 401 may receive the latest installation component. In step S402, the heterogeneous system 130 may connect the cloud system service component 401 automatically or based on the operation of the user or the tenant, so as to scan whether the latest installation component exists. In step S403, the heterogeneous system 130 may obtain the latest installation component from the cloud system service component 401. In step S404, when the heterogeneous system 130 completes the version update based on the latest installation component, the heterogeneous system 130 notifies the heterogeneous system management module 113. If the update of the heterogeneous system 130 fails, the heterogeneous system 130 also notifies the heterogeneous system management module 113. Therefore, the heterogeneous system management module 113 may effectively record the version information of the heterogeneous system 130.

Figure 5:
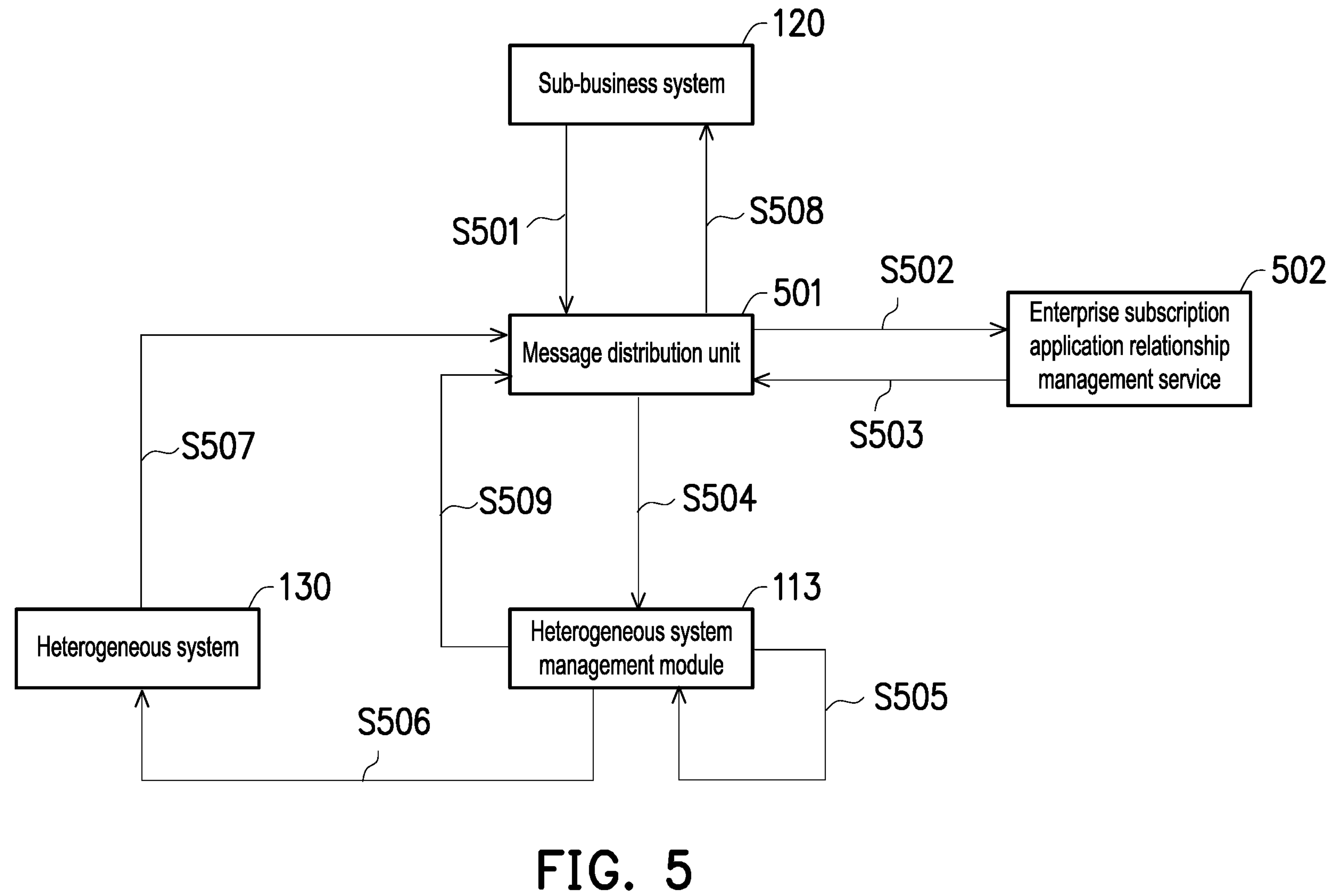
FIG. 5 is a schematic view illustrating a process of calling a heterogeneous system according to an embodiment of the disclosure.

FIG. 5 is a schematic view illustrating a process of calling a heterogeneous system according to an embodiment of the disclosure. With reference to FIG. 1 and FIG. 5, the version updating system 100 may perform following steps S501~S509, so that when a version updating notification is issued for the cloud application, whether to stop the sub-business system 120 from calling the heterogeneous system 130 may be determined. In this embodiment, the cloud server 110 may further execute a message distribution unit 501 and perform an enterprise subscription application relationship management service 502. In step S501, the sub-business system 120 may initiate a call request and provide a business code to the message distribution unit 501. In step S502, the message distribution unit 501 transmits the business code to the enterprise subscription application relationship management service 502. In step S503, the enterprise subscription application relationship management service 502 provides an application name and a product name (including a cloud system application version number and the minimum enterprise application version number of the heterogeneous system) corresponding to the business code to the message distribution unit 501 based on the business code. In step S504, the message distribution unit 501 obtains a dependency relationship between the cloud application and the heterogeneous system 130 through the heterogeneous system management module 113, so as to determine whether the version information of the heterogeneous system 130 meets the version requirements. The message distribution unit 501 may obtain the application name and the product name from the enterprise subscription application relationship management service 502 based on the business code and provide the application name and the product name to the heterogeneous system management module 113. In step S505, the heterogeneous system management module 113 obtains the dependency relationship between the cloud application and the heterogeneous system 130 according to the application name and the product name. In this embodiment, the dependency relationship may be a dependency relationship between the cloud system application version number of the cloud application and the minimum enterprise application version number of the heterogeneous system.

In step S506, when the version information of the heterogeneous system meets the version requirements, the heterogeneous system management module 113 initiates a data calling operation to the heterogeneous system 130. In step S507, the heterogeneous system 130 may return data to the message distribution unit 501. In step S508, the message distribution unit 501 may return data to the sub-business system 120 to complete the data calling operation. In another scenario, when the version information of the heterogeneous system fails to meet the version requirements, the heterogeneous system management module 113 notifies the message distribution unit 501 of suspending (denying access to) the heterogeneous system 130. Therefore, the version updating system 100 provided in this embodiment is able to effectively avoid service operation errors when the cloud application running on the cloud server is being updated.

The dependency relationship between the application name version number of the cloud application in the cloud system and the minimum enterprise application version number in the heterogeneous system may be exemplified and explained with reference to Table 1 below. Note that data required by the cloud application are originated from an enterprise application (i.e., the heterogeneous system). In this regard, even if the version of the enterprise application is outdated, the enterprise application may still provide sufficient data to the cloud application with a relatively new version. Therefore, the cloud application is required to provide the oldest enterprise application version number of the application depending on which the cloud application runs. The enterprise application version number is generated by an operator executing the version updating operation on the cloud application. Before the version updating operation of the cloud application is executed, the operator may provide or select a cloud-local version correspondence to generate and record version number data. For instance, when a new version of a cloud application is released and if a version correspondence between the cloud application and the enterprise application is required to be created, such information is recorded. Therefore, as the cloud system continues to update versions, the correspondence is not updated until both the cloud application and the enterprise application need to be updated simultaneously, and at this time the correspondence is updated again. The recorded information may be applied to determine the dependency relationship between the application name version number of the cloud application in the cloud system and the minimum enterprise application version number in the heterogeneous system.

With reference to Table 1 below, it is assumed that the cloud application and the heterogeneous system respectively perform version updates on April 10, May 10, June 10, and July 10, respectively. On April 10, the cloud application and the heterogeneous system successfully execute the version updating operation, respectively, and the system (i.e., the cloud server) may record that the dependency relationship between the version "1.0" of the cloud application and the version "1.0" of the heterogeneous system exists based on settings of the operator. On May 10, the cloud application and the heterogeneous system successfully execute the version updating operation, respectively, and the system (i.e., the cloud server) may record that no dependency relationship between the version "1.1" of the cloud application and the version "1.03" of the heterogeneous system exists based on the settings of the operator. On June 10, the cloud application and the heterogeneous system successfully execute the version updating operation, respectively, and the system (i.e., the cloud server) may record that no dependency relationship between the version "1.2" of the cloud application and the version "1.06" of the heterogeneous system exists based on the settings of the operator. On July 10, the cloud application and the heterogeneous system successfully execute the version updating operation, respectively, and the system (i.e., the cloud server) may record that the dependency relationship between the version "1.3" of the cloud application and the version "1.12" of the heterogeneous system exists based on the settings of the operator.

It is worth noting that on June 10, if the system determines that the heterogeneous system fails to be updated successfully and remains at version "1.03", it indicates that the heterogeneous system may still provide sufficient data for the cloud application because the system may find the version "1.0" of the heterogeneous system through the version "1.2" of the cloud application based on the dependency relationship. As such, the system may automatically determine that the service of the cloud application (i.e., the calling operation on the heterogeneous system) need not be suspended.

TABLE 1

| Release time | Cloud application | Heterogeneous system | Version of cloud application dependent on the heterogeneous system | Issue recorded | System determination basis |
|---|---|---|---|---|---|
| April 10 | 1.0 | 1.0 | 1.0 | Dependency relationship exists | |
| May 10 | 1.1 | 1.03 | 1.0 | No dependency relationship exists | |
| June 10 | 1.2 | 1.06 | 1.0 | No dependency relationship exists | Heterogeneous system fails to be updated successfully |
| July 10 | 1.3 | 1.12 | 1.12 | Dependency relationship exists | |

To sum up, according to the version updating system and the version updating method provided in one or more embodiments of the disclosure, the cloud server may automatically perceive whether the heterogeneous system that operates the enterprise system suspends providing business services when the cloud application run by the cloud server is being updated, so as to effectively prevent service operation errors.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A version updating system, comprising:

a cloud server comprising a processor and a storage device, wherein the cloud server executes a version updating tool, a version matching component, and a heterogeneous system management module, wherein the heterogeneous system management module communicates with a heterogeneous system and a sub-business system through one of a wired connection, a wireless connection, and the internet, wherein when the cloud server receives a version updating request for a cloud application, the version updating tool executes the version matching component to prompt the version matching component to obtain version information of the heterogeneous system through the heterogeneous system management module, wherein when the version information of the heterogeneous system fails to meet version requirements, the version matching component records that the version information of the heterogeneous system fails to meet the version requirements, and the version matching component transmits a version updating notification to the sub-business system, wherein after the sub-business system halts operation according to the version updating notification, the sub-business system notifies the version matching component that the suspension is completed, the version matching component notifies the version updating tool and prompts the version updating tool to perform a version updating operation for the cloud application, wherein the cloud server is further used to execute a message distribution unit, and the sub-business system initiates a call request to the message distribution unit, wherein the message distribution unit obtains a dependency relationship between the cloud application and the heterogeneous system through the heterogeneous system management module to determine whether the version information of the heterogeneous system meets the version requirements, wherein the dependency relationship is a dependency relationship between a cloud system application version number of the cloud application and a minimum enterprise application version number of the heterogeneous system.

2. The version updating system as claimed in claim 1, wherein when the cloud application successfully completes the version updating operation, the version updating tool notifies the version matching component of updating version information of the cloud application.

3. The version updating system as claimed in claim 1, wherein when the cloud application fails to be updated, the version updating tool notifies the version matching component, and the version matching component cancels version update of the heterogeneous system through the heterogeneous system management module.

4. The version updating system as claimed in claim 1, wherein the cloud server further executes a cloud system service component, wherein the heterogeneous system connects the cloud system service component to obtain a latest installation component, and when the heterogeneous system completes version update according to the latest installation component, the heterogeneous system notifies the heterogeneous system management module.

5. The version updating system as claimed in claim 1, wherein when the version information of the heterogeneous system fails to meet the version requirements, the heterogeneous system management module notifies the message distribution unit of denying access to the heterogeneous system.

6. The version updating system as claimed in claim 1, wherein when the version information of the heterogeneous system meets the version requirements, the heterogeneous system management module initiates a data calling operation to the heterogeneous system and returns data through the message distribution unit.

7. The version updating system as claimed in claim 1, wherein the cloud server performs an enterprise subscription application relationship management service, the sub-business system provides a business code to the message distribution unit, the message distribution unit obtains an application name and a product name from the enterprise subscription application relationship management service based on the business code and provides the application name and the product name to the heterogeneous system management module, so as to prompt the heterogeneous system management module to obtain the dependency relationship between the cloud application and the heterogeneous system based on the application name and the product name.

8. The version updating system as claimed in claim 1, wherein the heterogeneous system management module periodically visits the heterogeneous system to update the version information of the heterogeneous system.

9. A version updating method, comprising:

when a cloud server receives a version updating request for a cloud application, executing a version matching component by a version updating tool to prompt the version matching component to obtain version information of a heterogeneous system by a heterogeneous system management module;

initiating a call request to a message distribution unit by a sub-business system;

obtaining a dependency relationship between the cloud application and the heterogeneous system through the heterogeneous system management module by the message distribution unit, so as to determine whether the version information of the heterogeneous system meets version requirements;

when the version information of the heterogeneous system fails to meet the version requirements, recording by the version matching component that the version information of the heterogeneous system fails to meet the version requirements and transmitting a version updating notification to the sub-business system by the version matching component; and after the sub-business system halts operation according to the version updating notification, the sub-business system notifies the version matching component that the suspension is completed, notifying the version updating tool by the version matching component and prompting the version updating tool to perform a version updating operation for the cloud application, wherein the dependency relationship is a dependency relationship between a cloud system application version number of the cloud application and a minimum enterprise application version number of the heterogeneous system, and wherein the heterogeneous system management module communicates with the heterogeneous system and the sub-business system through one of a wired connection, a wireless connection, and the internet.

10. The version updating method as claimed in claim 9, further comprising:

when the cloud application successfully completes the version updating operation, notifying the version matching component by the version updating tool of updating version information of the cloud application.

11. The version updating method as claimed in claim 9, further comprising:

when the cloud application fails to be updated, notifying the version matching component by the version updating tool; and cancelling version update of the heterogeneous system through the heterogeneous system management module by the version matching component.

12. The version updating method as claimed in claim 9, further comprising:

connecting the heterogeneous system to a cloud system service component to obtain a latest installation component; and after the heterogeneous system completes version update according to the latest installation component, notifying the heterogeneous system management module by the heterogeneous system.

13. The version updating method as claimed in claim 9, further comprising:

when the version information of the heterogeneous system fails to meet the version requirements, notifying the message distribution unit by the heterogeneous system management module of denying access to the heterogeneous system.

14. The version updating method as claimed in claim 9, further comprising:

when the version information of the heterogeneous system meets the version requirements, initiating a data calling operation on the heterogeneous system by the heterogeneous system management module and returning data by the message distribution unit.

15. The version updating method as claimed in claim 9, further comprising:

providing a business code to the message distribution unit by the sub-business system; and obtaining an application name and a product name from an enterprise subscription application relationship management service according to the business code by the message distribution unit and providing the application name and the product name to the heterogeneous system management module, so as to prompt the heterogeneous system management module to obtain the dependency relationship between the cloud application and the heterogeneous system based on the application name and the product name.

16. The version updating method as claimed in claim 9, wherein the heterogeneous system management module periodically visits the heterogeneous system to update the version information of the heterogeneous system.

* * * * *